(12) United States Patent
Sassnowski

(10) Patent No.: US 9,310,005 B2
(45) Date of Patent: Apr. 12, 2016

(54) CLAMPING DEVICE, IN PARTICULAR FOR HOSES

(75) Inventor: Helmut Sassnowski, Horb-Altheim (DE)

(73) Assignees: Raimund Rerucha, Stuttgart (DE); Rupert Höllbacher, Durach (DE)

( * ) Notice: Subject to any disclaimer, the term of this patent is extended or adjusted under 35 U.S.C. 154(b) by 208 days.

(21) Appl. No.: 14/000,605

(22) PCT Filed: Feb. 17, 2012

(86) PCT No.: PCT/EP2012/000691
§ 371 (c)(1),
(2), (4) Date: Oct. 22, 2013

(87) PCT Pub. No.: WO2012/113524
PCT Pub. Date: Aug. 30, 2012

(65) Prior Publication Data
US 2014/0033481 A1 Feb. 6, 2014

(30) Foreign Application Priority Data
Feb. 21, 2011 (DE) .......................... 10 2011 012 421

(51) Int. Cl.
*F16L 33/02* (2006.01)
*F16L 33/03* (2006.01)
*F16L 33/035* (2006.01)

(52) U.S. Cl.
CPC ................. *F16L 33/02* (2013.01); *F16L 33/03* (2013.01); *F16L 33/035* (2013.01); *Y10T 24/1412* (2015.01)

(58) Field of Classification Search
CPC ........ B25B 5/122; B25B 5/085; B25B 5/102; B25B 11/02; F16L 33/02; F16L 33/03; F16L 33/035; F16L 33/16; Y10T 24/1412; Y10T 24/1476; Y10T 24/1494
USPC ........ 81/9.3, 319, 324, 325; 269/25; 173/170; 403/105, 281–283; 292/307 R, 307 A, 292/307 B; 70/16, 18, 30, 49, 59–61; 24/28, 24/26, 19, 602, 603
See application file for complete search history.

(56) References Cited

U.S. PATENT DOCUMENTS

| 2,546,098 A | 3/1951 | Houghton |
| 4,009,461 A * | 2/1977 | Usry ............................ 336/197 |
| 4,247,064 A * | 1/1981 | Schulman et al. ..... 244/122 AG |

(Continued)

FOREIGN PATENT DOCUMENTS

| CN | 2121600 | 11/1992 |
| CN | 2543665 | 4/2003 |

(Continued)

*Primary Examiner* — Abigail Morrell
(74) *Attorney, Agent, or Firm* — Gudrun E. Huckett

(57) ABSTRACT

The clamping device has a clamping element (9) which can be moved from a starting position into a clamping position. The clamping element (9) is located in a housing (6) and bounds a pressure space in which a pressure medium is accommodated. By actuation of a trigger element (52), the pressure medium acts on the clamping element (9), which as a result is moved out of the starting position and into the clamping position. No tool is required to trigger the clamping element (9), and so the clamping device (9) can be handled easily and without problems. The trigger element (52) is a constituent part of the clamping device (9) and is available whenever the clamping operation is intended to be initiated.

17 Claims, 18 Drawing Sheets

(56) References Cited

U.S. PATENT DOCUMENTS 4,571,975 A * 2/1986 Pawloski et al. ............... 72/325
5,125,296 A * 6/1992 Nelson et al. .................. 81/9.3
5,595,026 A * 1/1997 Licking et al. ............... 49/360
6,898,825 B1 5/2005 Charest

FOREIGN PATENT DOCUMENTS

| GB | 400 139 | 10/1933 |
| GB | 2 089 267 | 6/1982 |
| WO | 03/008815 A1 | 1/2003 |
| WO | 2005/047727 A1 | 5/2005 |

* cited by examiner

CLAMPING DEVICE, IN PARTICULAR FOR HOSES

BACKGROUND OF THE INVENTION

The invention concerns a clamping device, in particular for hoses, comprising at least one clamping element that is moveable from a starting position into a clamping position.

Clamping devices in the form of hose clamps with which hoses are secured on pipes are known. The clamping strap is pulled together by means of a clamping screw in order to fasten the hose on the pipe. For actuating the clamping screw, a tool is required; this makes handling of the clamping device more difficult.

The object of the invention is to configure the clamping device of the aforementioned kind in such a way that it enables in a simple way and without the assistance of a tool movement of the clamping element from a starting position into a clamping position.

SUMMARY OF THE INVENTION

According to the invention, this object is solved for the clamping device of the aforementioned kind in that the clamping element delimits in a housing a pressure chamber in which at least one pressure medium is housed that loads, actuated by at least one trigger element, the clamping element and moves it from the starting position into the clamping position.

In the clamping device according to the invention, the clamping element delimits within the housing the pressure chamber in which the pressure medium is contained. By actuation of the trigger element, the pressure medium loads the clamping element and moves it from the starting position into the clamping position. For triggering the clamping element no tool is required so that the clamping device can be handled in a simple way without problems. The trigger element is a component of the clamping device and is therefore available at any time for initiating the clamping process.

The clamping element is advantageously a piston that is supported slidably within the housing.

Preferably, the clamping element is designed such that it is moveable only in the direction of pressure loading. In this way, it is ensured that the force generated by the clamping element is maintained at all times and is not reduced by a return movement.

In an advantageous embodiment, securing of the clamping element against return movement in a direction opposite to the pressure loading direction is realized by at least one locking element.

This locking element is advantageously a locking pawl that under spring force engages a toothing which is provided on the clamping element. The locking pawl is always secured by the spring force in engagement with the toothing so that reliably a movement of the clamping element opposite to the pressure loading direction is prevented. The locking pawl is moreover a simple and inexpensive component that can also be attached easily on the housing of the clamping device.

The clamping element is advantageously provided with at least one connector for an end of a clamping ring. The connector can be formed by a bearing pin on which the end of the clamping ring is arranged. The clamping ring can be used for clamping a hose on a connecting piece, such as a pipe.

The other end of the clamping ring is advantageously connected to at least one housing-side connector that is, for example, formed by a bearing pin.

When the clamping element is moved by the pressure medium, the piston-side connector is adjusted relative to the housing-side connector such that the clamping ring is elastically contracted and exerts a clamping force on the hose surrounded by it.

Advantageously, the end of the clamping ring that is located on the piston-side connector and/or on the housing-side connector is designed as an expansion section. Due to the expansion section, diameter enlargements of the hose, as they occur upon heating of the hose, for example, can be compensated by elastic deformation. Heating of the hose occurs, for example, when a medium at higher temperature flows through it, as is the case, for example, for cooling water hoses in internal combustion engines of motor vehicles. Since the clamping ring as a result of the expansion section can follow the diameter enlargements of the hose by elastic deformation, damage of the hose is avoided. As the hose cools down again and its diameter becomes smaller, the expansion section then returns into its initial form.

When both ends of the clamping ring are designed as expansion compensation sections, greater diameter expansions of the hose can also be reliably compensated by an appropriate elastic deformation.

The ends of the clamping ring are advantageously annular and designed to be elastically expandable. With the annular ends the clamping ring can be mounted simply on the housing-side and piston-side connectors. The manufacture of the ring ends is possible in a simple way. The clamping element is positioned transversely to the ring ends and also transversely to the clamping ring axis.

Advantageously, in the pressure chamber at least one container is disposed that is opened by means of the trigger element for releasing the pressure medium.

In order for the container disposed in the pressure chamber to be opened in a simple way, the trigger element is provided with at least one opening element.

In a preferred embodiment, the opening element has at least one, preferably however several pointed teeth. With them, the container can be reliably penetrated and the contents of the container released thereby.

Advantageously, in the container, preferably in several containers, liquid starting materials are contained which, after opening of the container, react chemically with each other and form a foam that forms the pressure medium that acts on the clamping element. The starting materials required for generating the foam can be contained in different chambers of a single container but can also be provided in their own containers, respectively.

In order for the trigger element to be actuated in a simple way, it is provided with a grip member that is positioned outside of the housing. It is connected by at least one connecting part with the opening element in the pressure chamber. By pulling the grip member, the opening element can be pulled toward the container and can open it thereby.

So that the grip member with the connecting part does not remain on the housing after the clamping process, it is provided with at least one cutting edge. With it, the connecting part can be severed after opening of the container.

Further features of the invention result from the further claims, the description, and the drawings.

BRIEF DESCRIPTION OF THE DRAWINGS

The invention will be explained with the aid of embodiments illustrated in the drawings in more detail. It is shown in.

DESCRIPTION OF PREFERRED EMBODIMENTS

Figure 1:
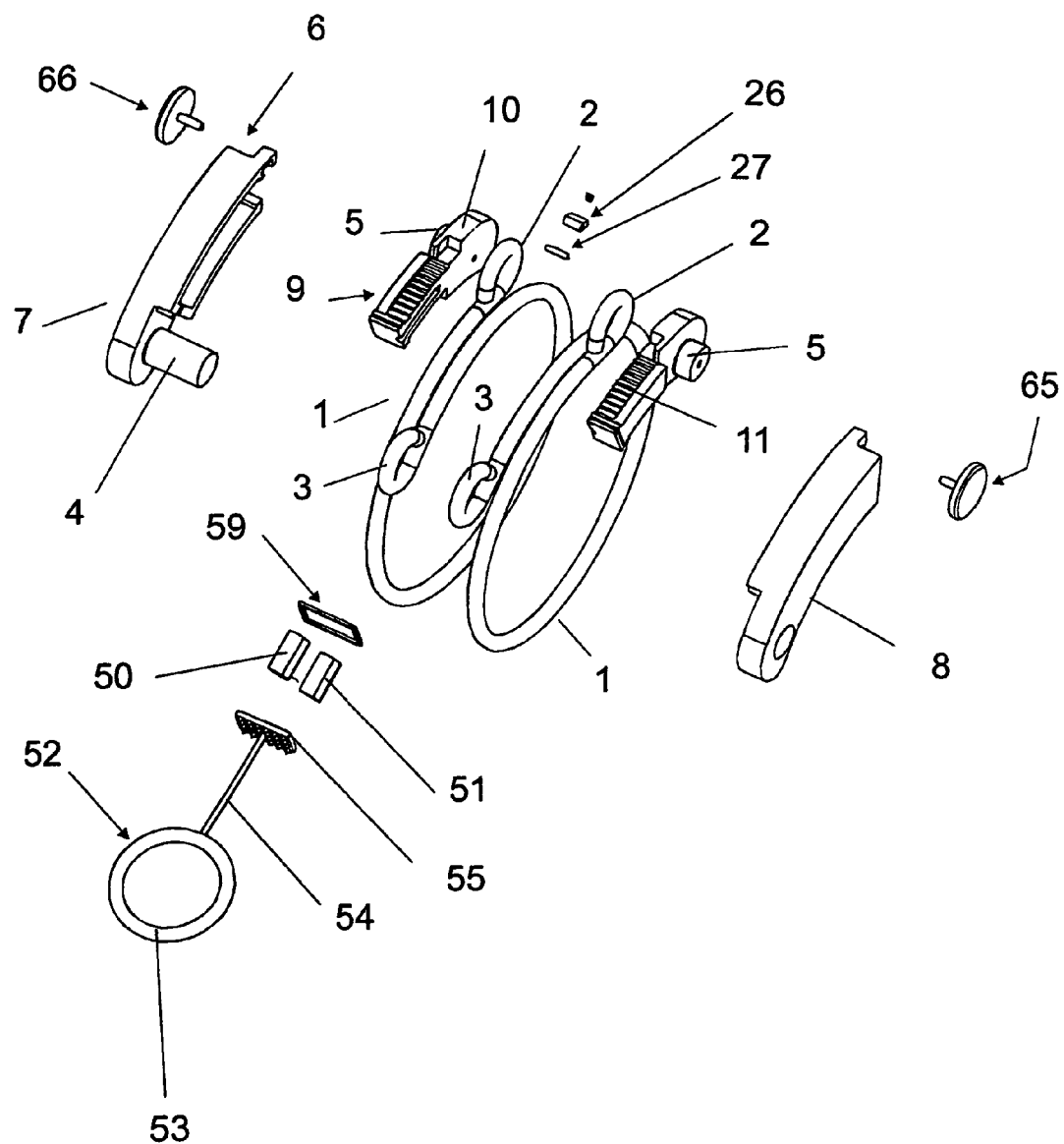
FIG. 1 in a perspective illustration a clamping device according to the invention.

The clamping device according to FIGS. 1 to 14 serves for attaching hoses on connecting sockets by clamping force. For this purpose, at least one clamping ring 1 is provided. Advantageously, the clamping device has two clamping rings 1 that are configured and arranged mirror-symmetrical to each other. The ends of the clamping rings 1 are shaped as rings 2, 3 that are seated on bearing pins 4, 5. The bearing pin 4 is stationarily provided on a housing 6 while the bearing pin 5 is slidable relative to the housing 6 for contracting the clamping rings 1. The housing 6 is comprised of two housing parts 7, 8 that are connected advantageously non-detachably, for example, by welding, to each other and are advantageously made of plastic material.

The bearing pin 4 is formed monolithically with the housing part 7. The bearing pin 5 is provided on a piston 9, preferably monolithically formed therewith. The piston 9 is comprised of two piston parts 10, 11 that are formed mirror-symmetrical to each other and are connected fixedly to each other. By displacing the piston 9 relative to the housing 6, the clamping rings 1 are elastically contracted and, in this way, the hose (not illustrated) surrounded by the clamping rings 1 is clamped on the connecting piece, for example, a pipe.

Figure 2:
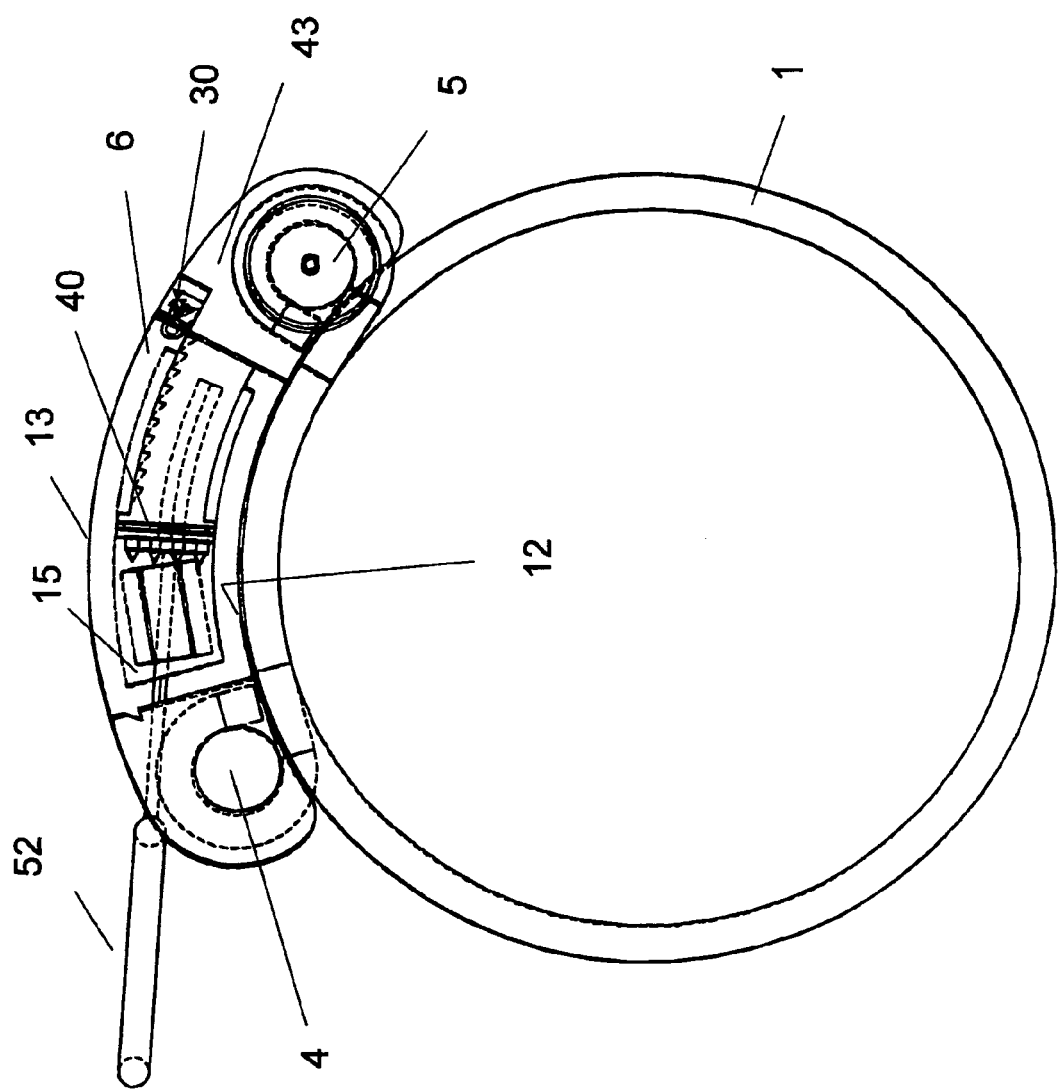
FIG. 2 a side view of the clamping device according to FIG. 1.
Figure 3:
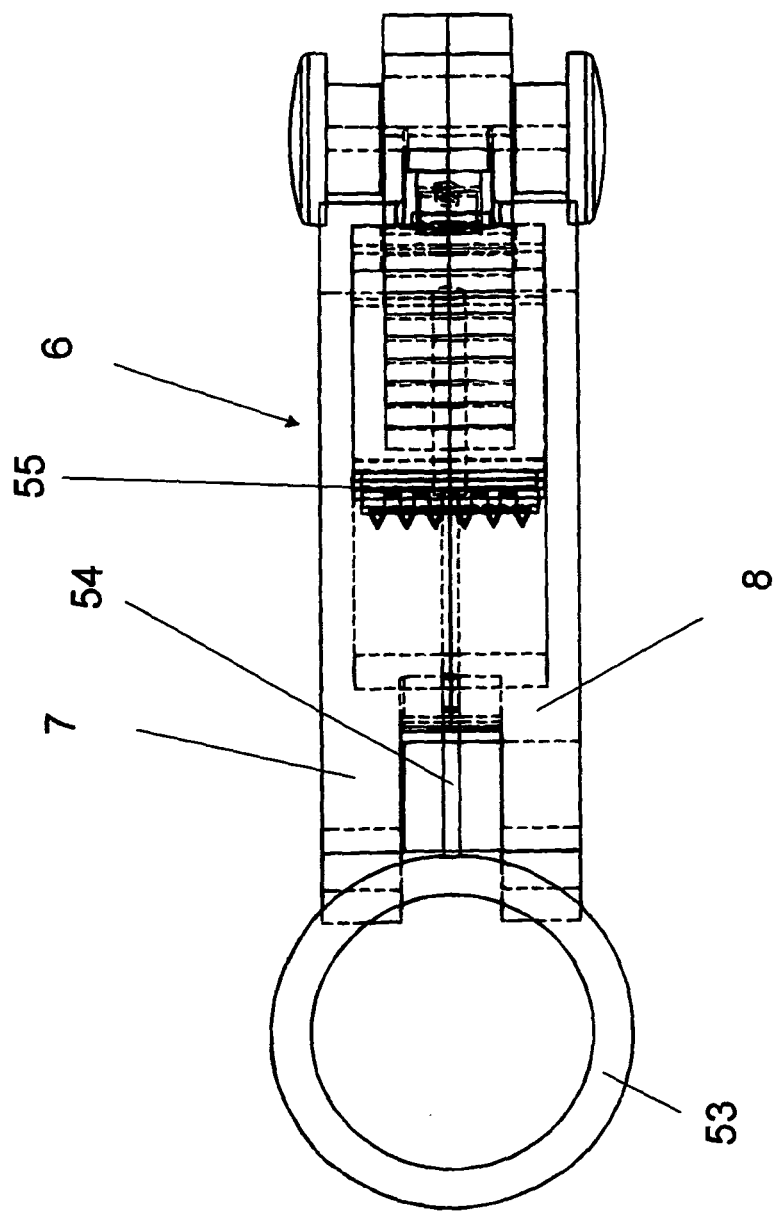
FIG. 3 a plan view onto the clamping device according to FIG. 2.
Figure 4:
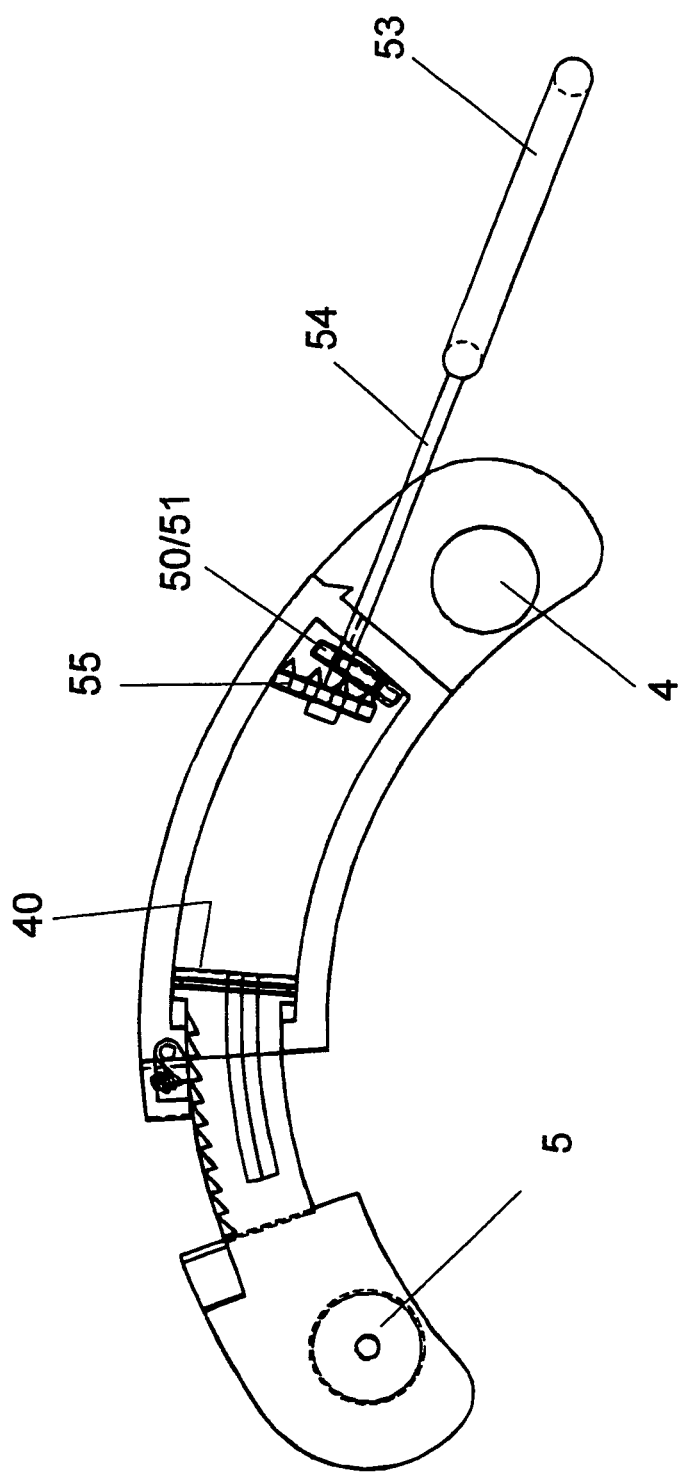
FIG. 4 in a side view the clamping device according to FIG. 1 in the operating state without clamping rings.
Figure 5:
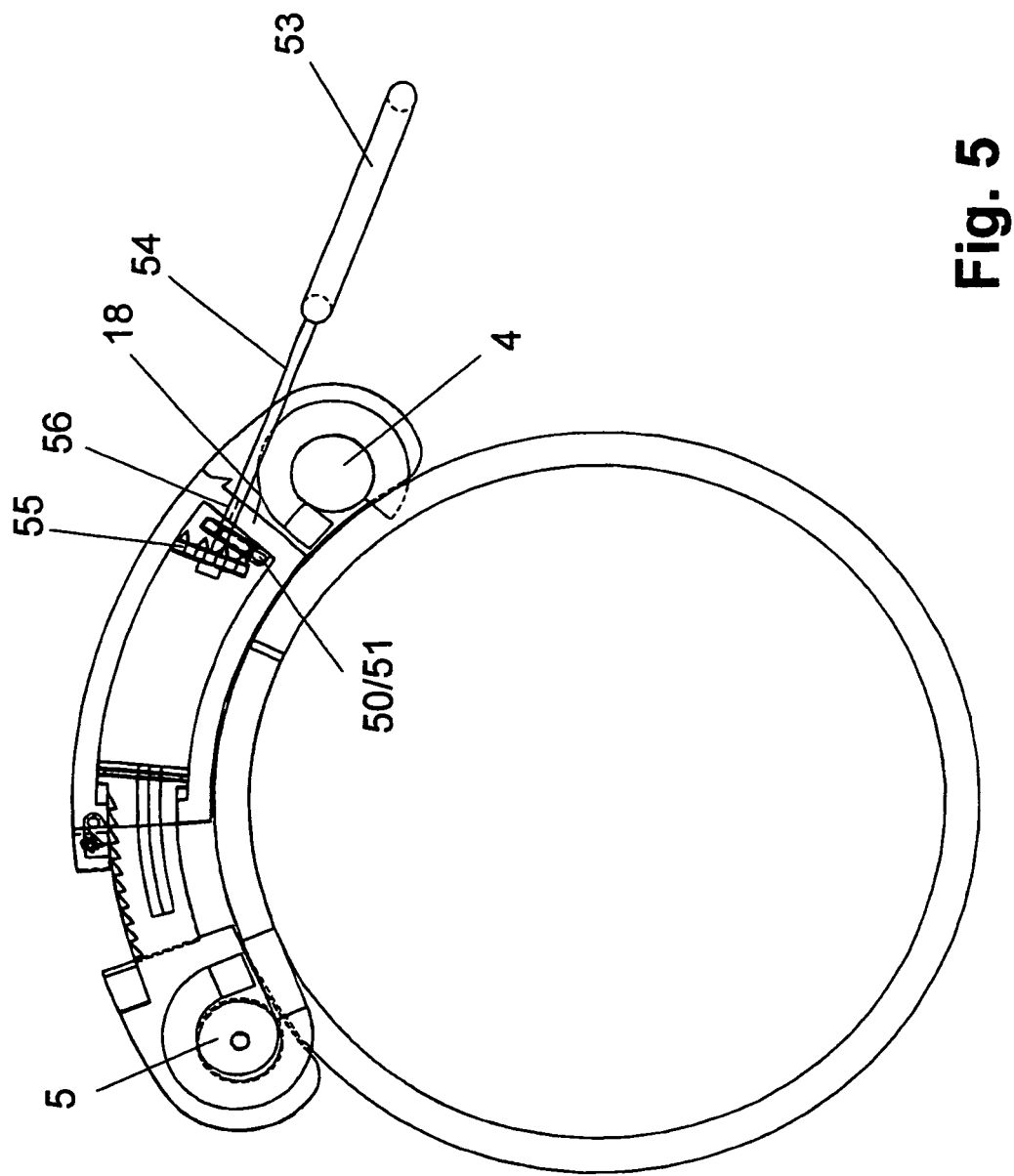
FIG. 5 the clamping device according to FIG. 4 with clamping rings.

The housing 6 is advantageously designed such that it has a bottom side facing the clamping rings 1 that is curved such that it has approximately the same radius of curvature as the clamping rings 1 (FIG. 2). The housing bottom side 12 (FIG. 6) extends with a continuous curvature and passes in an arc shape into a topside 13 of the housing 6 that extends advantageously parallel to the housing bottom side 12.

The housing part 7 has a sidewall 14 (FIG. 7) that projects past a piston chamber 15. It is delimited by a bottom 16, a top 17 and an end wall 18. The sidewall 14 projects past the end wall 18 and in this area is provided with a transversely projecting bearing pin 4. The top 17 of the housing part 7 forms with its outer side a portion of the housing topside 13 while the underside of the bottom 16 forms a part of the housing bottom side 12.

The piston chamber 15 is open at the end which is opposite the end wall 18. From the underside of the top 17 as well as from the top side of the bottom 16, a short web 19, 20 is projecting, respectively; they are positioned opposite each other at a spacing and delimit a through opening 21 for the piston 9.

The housing part 8 (FIG. 8) has also the piston chamber 15 which is delimited by the bottom 16, the top 17, and the end wall 18. A sidewall 22 of the housing part 8 projects past the end wall 18 and is provided in this area with an opening 23 into which the bearing pin 4 projects. The bottom 16 and the top 17 are provided at the end that is positioned opposite the end wall 18 with a flat web 19, 20. The two webs delimit the through opening 21 for the piston 9.

When the two housing parts 7, 8 are connected to each other, they delimit together the piston chamber 15.

Figure 7:
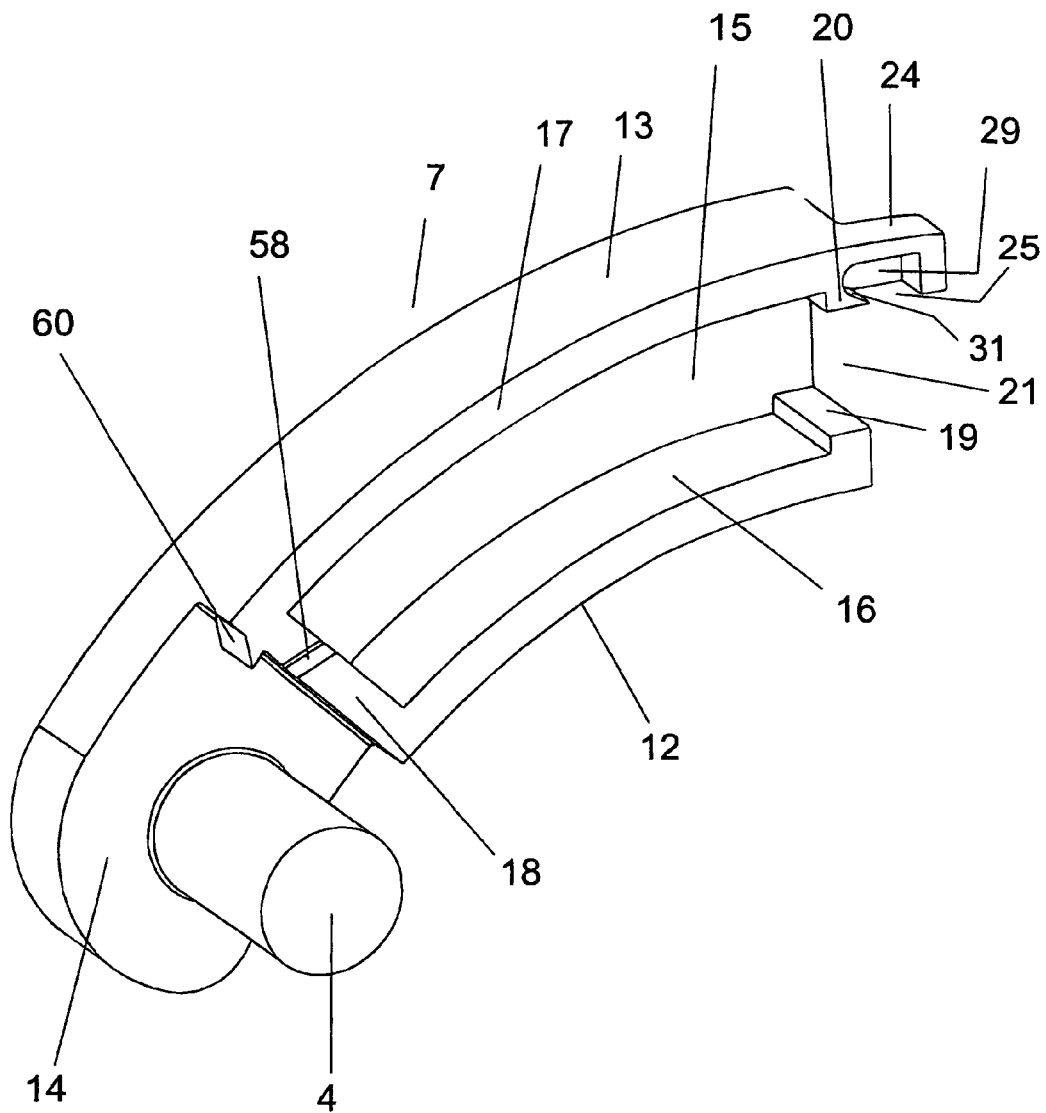
FIG. 7 in perspective illustration the first housing part of the housing according to FIG. 6.
Figure 8:
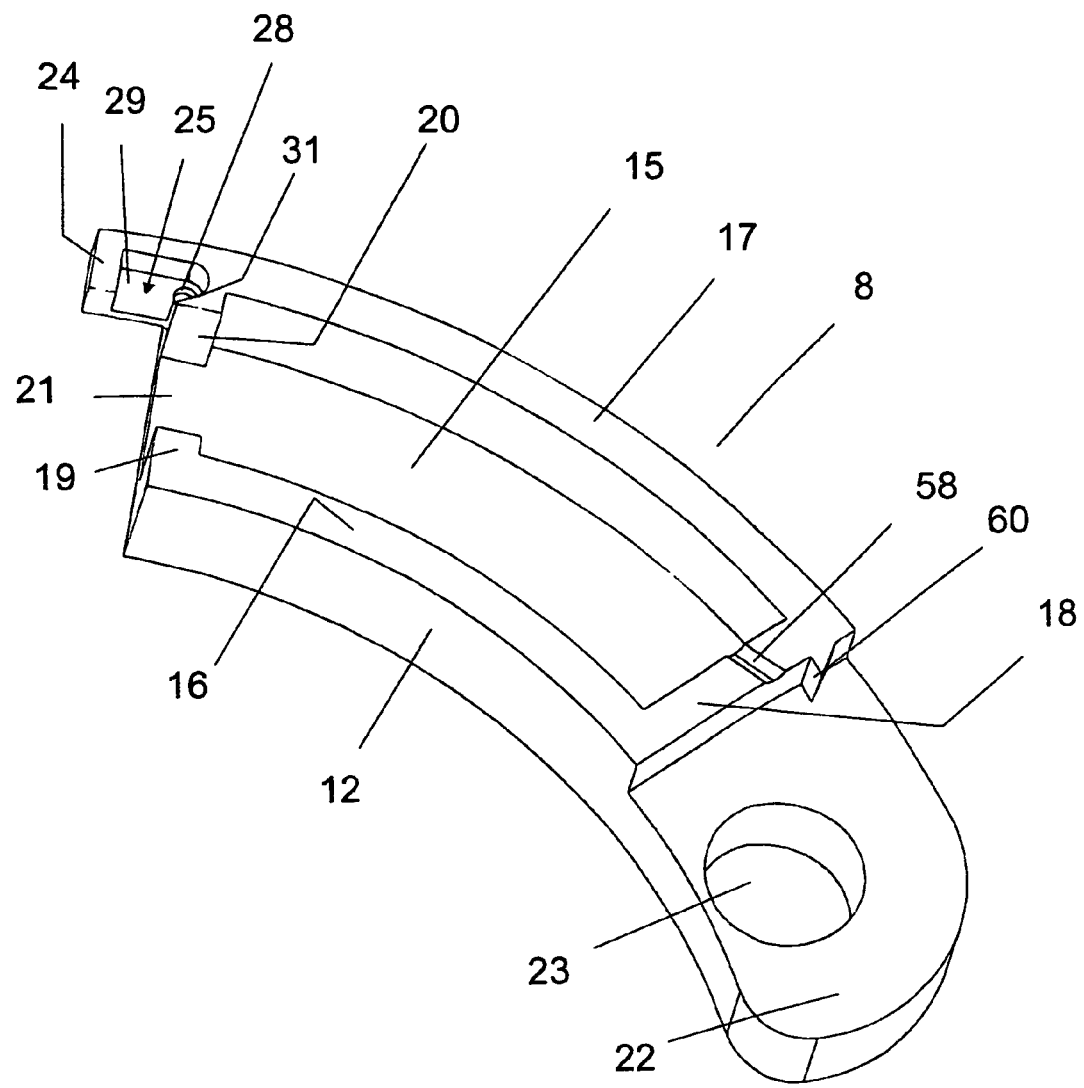
FIG. 8 the other housing part of the housing according to FIG. 6 in perspective illustration.
Figure 9:
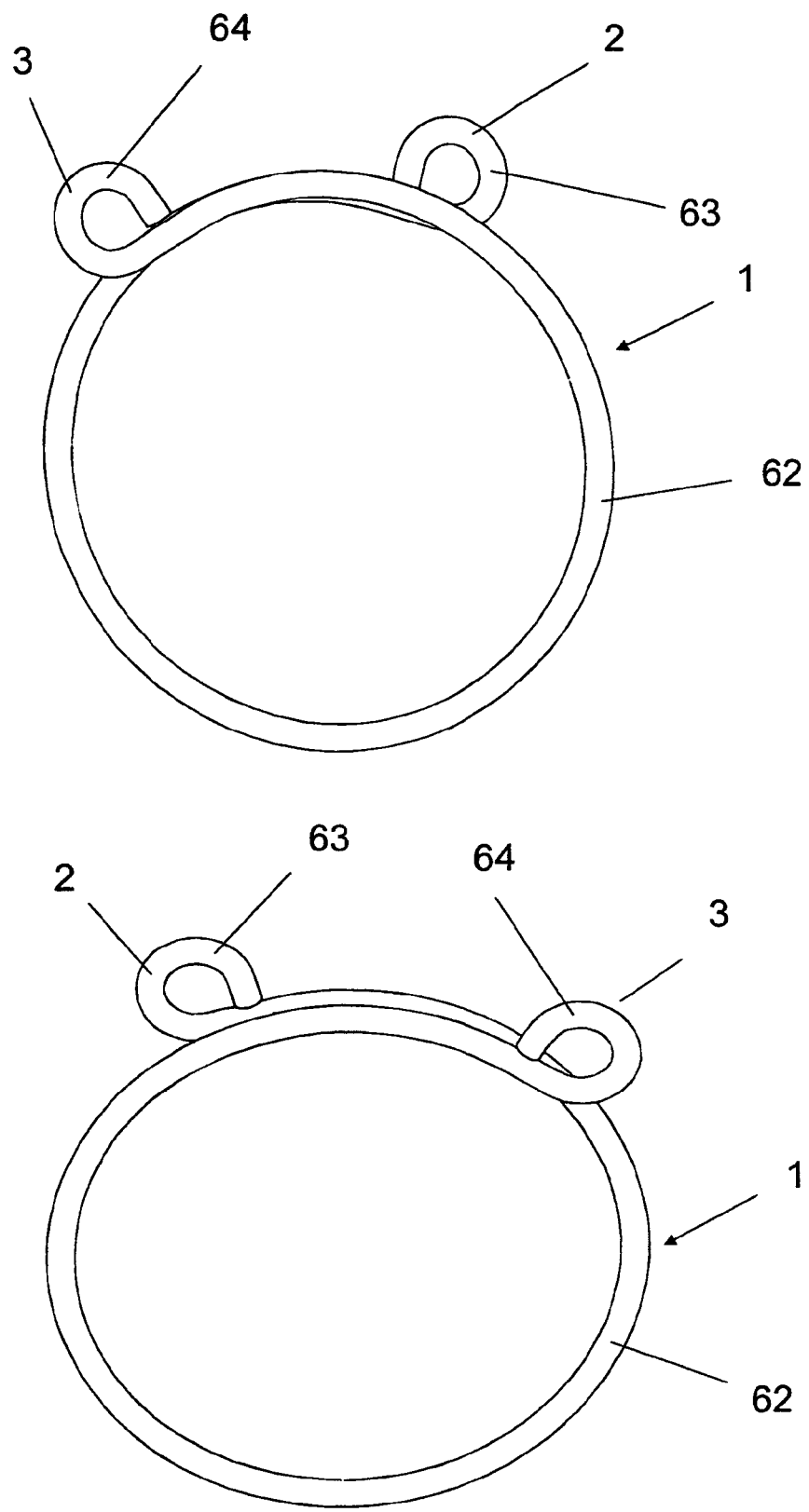
FIG. 9 in perspective illustration two clamping rings of the clamping device.

The two housing parts 7, 8 each have, in the area of the through opening 21, a projection 24 projecting past the top 17 in which a mounting space 25 is provided for a locking pawl 26 (FIG. 1). The mounting space 25 is open toward the housing bottom side 12. The locking pawl 26 is seated on a bearing pin 27 which is supported with its end in depressions 28 in the sidewalls 29 of the mounting space 25. The locking pawl 26 can rest under the force of at least one pressure spring 30 on a slanted surface 31 which delimits the mounting space 25 at one side (FIGS. 7 and 8). The slanted surface 31 is provided at the exterior side of the web 20 of the housing parts 7, 8.

The pressure spring 30 is advantageously a coil pressure spring that is supported in a suitable way in the mounting space 25. The pressure spring 30 is pretensioned so that the locking pawl 26 is reliably force-loaded.

Figure 10:
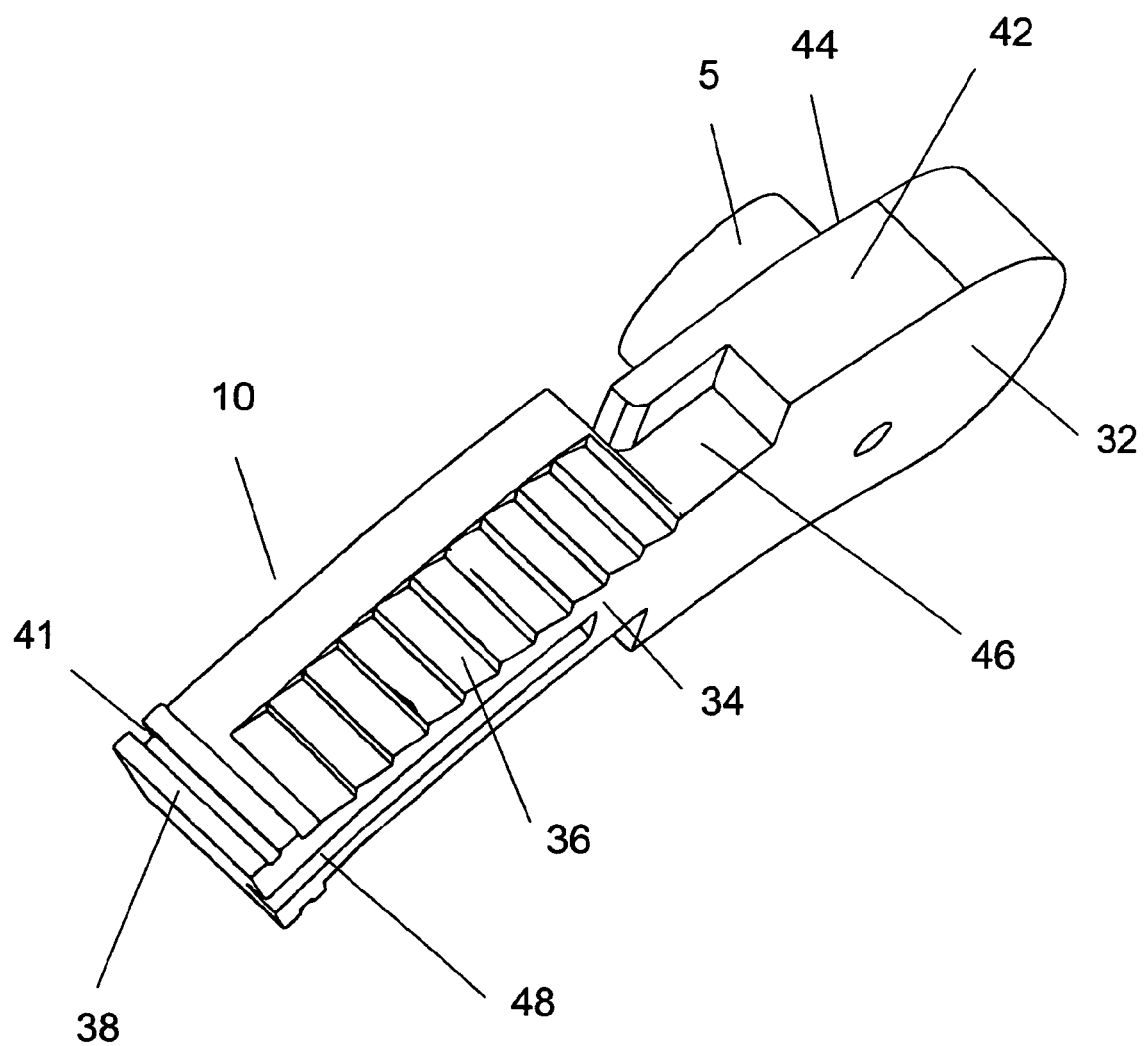
FIG. 10 in perspective illustration the first part of the piston of the clamping device according to FIG. 1.
Figure 11:
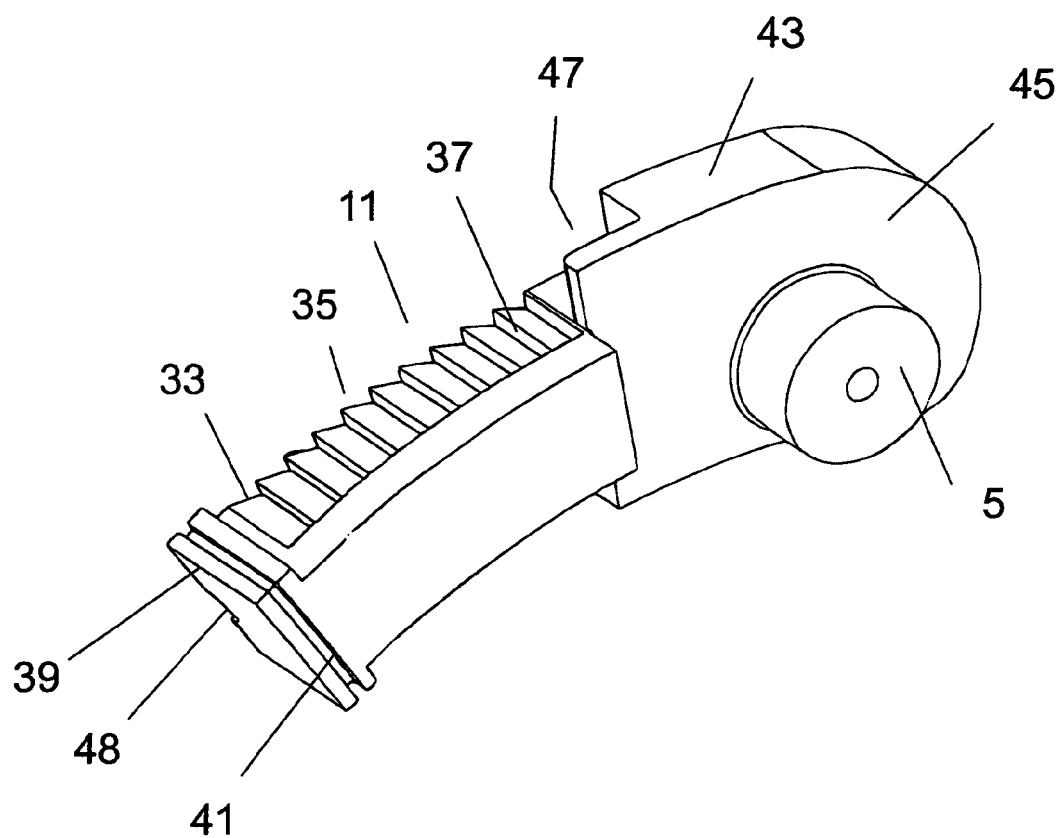
FIG. 11 in perspective illustration the other part of the piston of the clamping device according to FIG. 1.
Figure 12:
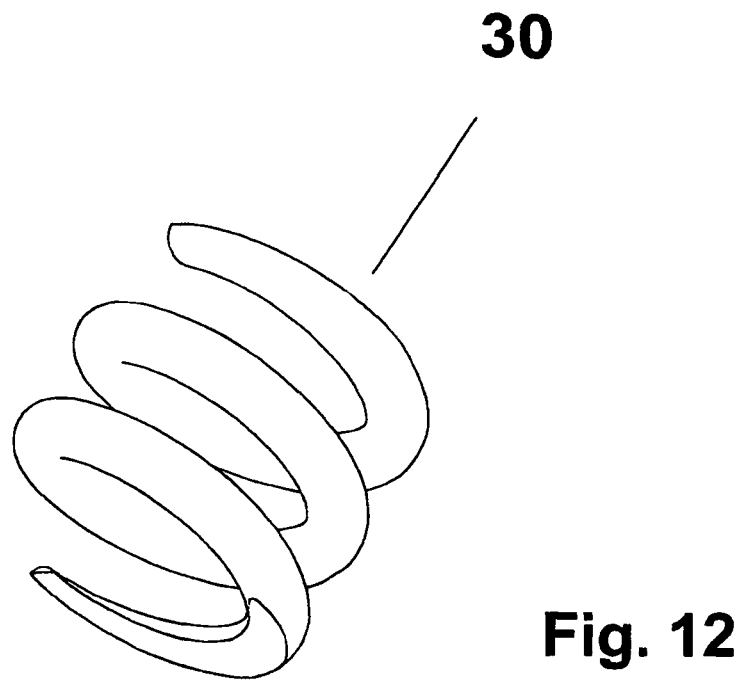
FIG. 12 in perspective illustration a pressure spring of the clamping device according to FIG. 1.
Figure 13:
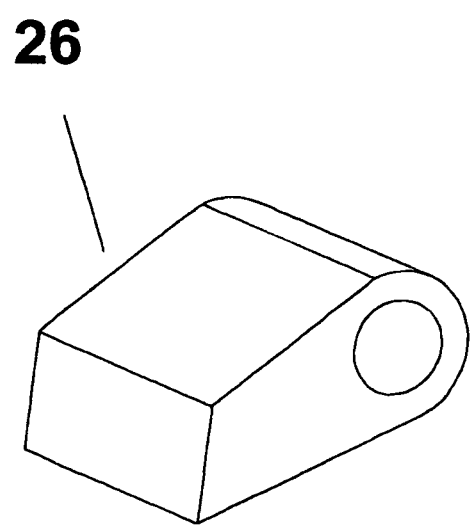
FIG. 13 in perspective illustration a locking pawl of the clamping device according to FIG. 1.

The piston 9 is of a two-part configuration like the housing 6 and is formed by the two piston parts 10, 11 to be described in more detail with the aid of FIGS. 10 and 11. The two piston parts 10, 11 are connected to each other with their facing inner sides 32, 33 resting against each other. Both piston parts 10, 11 have a locking part 34, 35 which is provided at its topside with pawl teeth 36, 37. The locking pawl 26 interacts with them such that the piston 9 can be moved in only one direction and is blocked in opposite direction by the locking pawl 6.

The locking parts 35, 34 project through the through opening 21 into the piston chamber 15 of the housing 6. At the free end the locking parts 34, 35 are provided with a piston end part 38, 39. The end faces of the piston end parts 38, 39 form the piston surface 40 (FIGS. 2 and 4) which is loaded with a pressure medium during the clamping process. The piston end parts 38, 39 are provided circumferentially with a groove 41 that receives a sealing ring with which the piston 9 is sealed relative to the wall of the piston chamber 15.

The locking parts 34, 35 are embodied to be curved across their length and adjoin a bearing part 42, 43 that is positioned outside of the piston chamber 15. A bearing pin 5, on which one end of the clamping rings 1 is seated respectively, projects transversely from each one of outer sides 44, 45 of the bearing parts 42, 43 that are facing away from each other. The bearing parts 42, 43 project past the pawl teeth 36, 37 as well as the opposite side of the locking parts 34, 35. With this projecting part the bearing parts 42, 43 are resting in their initial position according to FIG. 2 against the webs 19 of the housing parts 7, 8. The bearing parts 42, 43 form substantially a continuous extension of the housing in the starting position.

The bearing parts 42, 43 are provided at their topside each with a recess 46, 47 into which the projection 24 of the housing 6 projects in the starting position.

The piston 9 is provided centrally with a blind bore-type recess 48 extending in its longitudinal direction which opens at the end-face piston surface.

Figure 6:
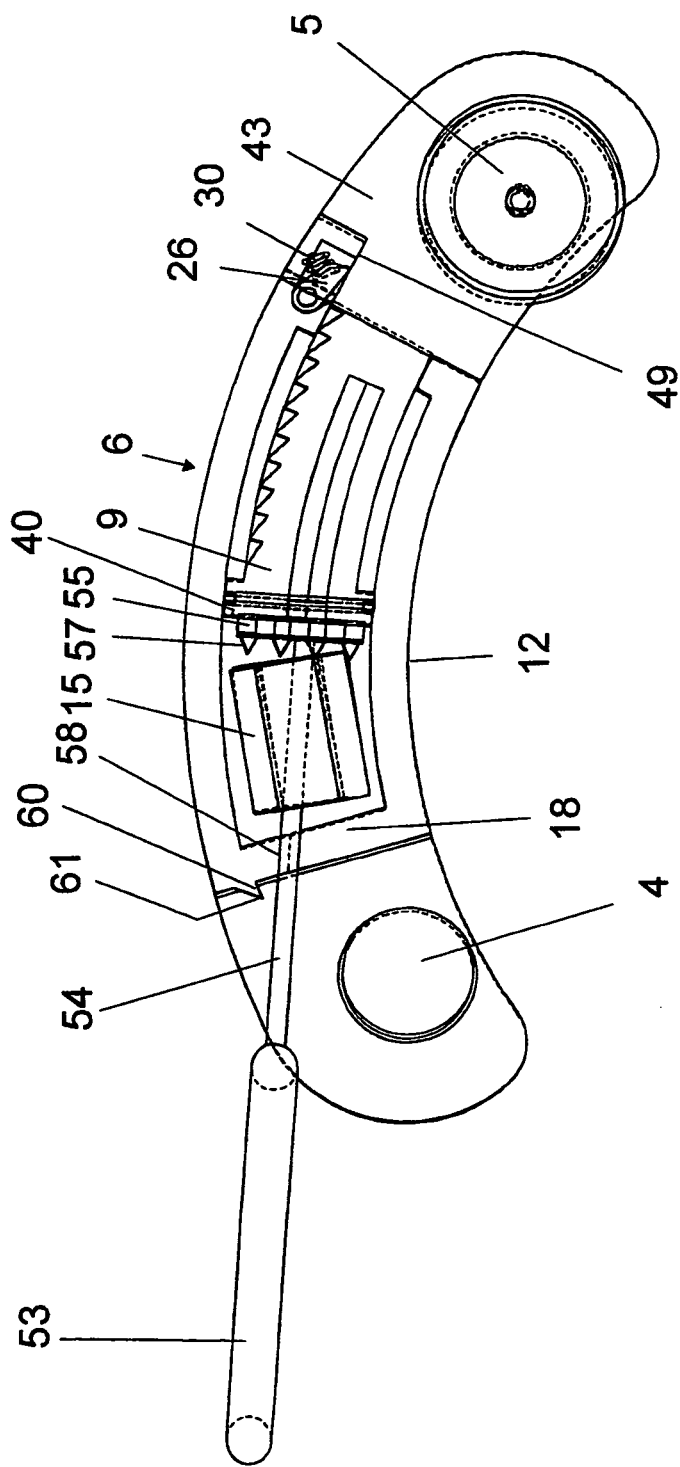
FIG. 6 in an enlarged illustration the clamping device according to FIG. 1 in the operating state with opened housing but without clamping rings.

As shown in FIG. 6, in the starting position of the clamping device the piston 9 is completely disposed within the piston chamber 15 of the housing 6. Under the force of the pressure spring 30, the locking pawl 26 is resting with its end on the bottom 49 of the recess 46, 47 of the bearing parts 42, 43.

The piston chamber 15 is longer than the piston 9. Between the end wall 18 of the housing 6 and the free end of the piston 9 there remains thus a free space in which a pressure medium can be housed with which the piston 9 can be moved for clamping the clamping rings 1. The pressure medium is formed by the chemical reaction of liquid reactive starting materials with generation of a foam. When polyols are mixed with polyisocyanates and a foaming medium, in general water, as well as optionally a catalyst, the polyol reacts with the polyisocyanate by a polyaddition reaction to polyurethane foam. The foaming agent forms gas inclusions. When water is used as a foaming agent, it reacts with a portion of the polyisocyanate and releases carbon dioxide. The amine which is produced thereby can optionally react further with the remaining isocyanate to a urea derivative and contribute to stabilization of the cross-linked structure. The foaming agent in general is admixed to the polyol. In this case, for producing the polyurethane foam, two phases are used which are each housed in a container 50, 51 (FIG. 1). It is also possible to utilize only one container that has two chambers for these two phases.

Depending on the selection of the employed starting materials, the properties of the polyurethane foam can be adjusted. When long-chain polyols are used, soft to elastic foams are formed while the use of short-chain polyols produces greatly cross-linked hard foam materials.

When the two components are mixed with each other, the resulting polyurethane foam then loads the piston surface 40 and displaces the piston 9.

The components contained in the containers 50, 51 are matched to each other such that the foam formed upon reaction of the components exerts such a force onto the piston 9 that the clamping rings 1 are contracted in a sufficient amount so much that the hose is safely clamped onto the connecting piece.

When the piston 9 is pushed out of the housing 6, the locking pawl 26 slides across the pawl teeth 36, 37. The pressure spring 30 ensures that the locking pawl 26 remains always in engagement with the pawl teeth 36, 37. The pawl teeth 36, 37 in combination with the locking pawl 26 prevent that the piston 9 can be pushed back. In this way, it is ensured that the piston 9 in any position is secured properly against being pushed back and that it is ensured in this way that the clamping rings 1 reliably clamp the hose on the connecting piece.

Since the piston 9 is secured by the locking pawl 26 in its respective extended position, the pressure medium that is produced by the chemical reaction must act only for pushing out the piston 9. This pressure medium can thus also be, for example, a gas that applies a sufficient pressure on the piston surface 40.

The resulting foam can also cure within the piston chamber 15 because the clamping device is designed such that the piston 9 cannot be returned but is blocked by the locking pawl 26 in the respective pulled-out position.

Figure 14:
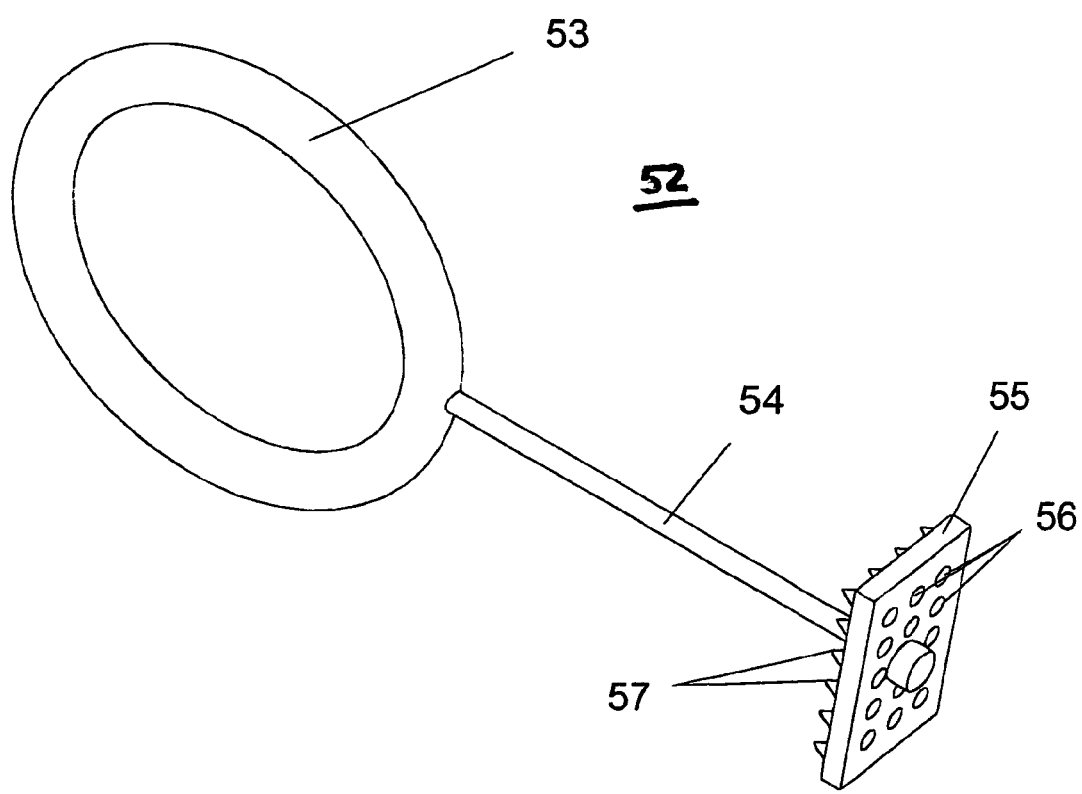
FIG. 14 in perspective illustration a trigger element of the clamping device according to FIG. 1.

In order for the components in the containers 50, 51 to be released, the clamping device is provided with a trigger element 52. It has a grip member 53 positioned outside of the housing 6. It is embodied in the embodiment as a ring but can of course also have any other suitable shape. The grip member 53 is connected by a thin connecting member 54 with the plate-shaped opening element 55 (FIG. 14). It is penetrated by at least one, preferably several openings 56 and is provided at its side facing the grip member 53 with projecting pointed teeth 57. The end of the connecting part 54 projecting past the opening element 55 is seated with clamping action in the recess 48 of the piston 9.

The connecting part 54 projects through an opening 58 in the end wall 18 of the housing 6. The opening 58 in the end wall 18 has such a minimal diameter that a sealing action relative to the piston chamber 15 is not required.

The contour of the opening element 55 corresponds to the inner cross-section of the piston chamber 15. Advantageously, on the opening element 55 a rectangular annular seal 59 (FIG. 1) is provided with which the opening element 55 seal-tightly rests on the inner wall of the piston chamber 15.

The opening element 55 is positioned in the area between the end-face piston surface 40 of the piston 9 and the containers 50, 51 (FIGS. 2 and 6). When the hose is to be clamped on the connecting piece, the opening element 55 is pushed against the containers 50, 51 by means of the grip member 53. The teeth 57 penetrate the containers 50, 51 which are embodied e.g. as plastic bags and release in this way the components contained therein. They flow through the openings 56 of the opening element 55 and form in the described way the pressure medium acting on the piston surface 40 and thus moving the piston 9. The trigger element 52 is moved in a single stroke. No high force is required for opening the containers 50, 51 by the teeth 57. The containers 50, 51 are compressed by the opening element 55 between the end wall 18 of the housing 6 and the flow element 55 (FIGS. 4 and 5) so that the components contained in the containers are completely pushed out. Subsequently, the connecting part 54 can be cut off by a movement transversely to its longitudinal direction. For this purpose, on the exterior side of the end wall 18 a projecting tear-off part 60, which in cross-section is of a triangular shape, is provided, wherein the connecting part 54 can be severed on its edge 61 by an appropriate transverse movement. Since the connecting part 54 is thin, it can be cut through easily along the tear-off edge 61. When in a preferred embodiment the trigger element 52 is made of plastic material, the separating process can be carried out in a simple way.

The clamping rings 1 are coiled such that, viewed in axial direction of the clamping rings, they form in the untensioned state a closed ring (FIG. 1). Accordingly, the clamping rings 1 surround in the undeformed state the hose completely.

The free ends of the clamping rings 1 are formed to rings 2, 3. The clamping rings 1 have a coiled annular body 62 (FIG. 9) that extends across more than 360° and passes continuously curved into the ring ends 2, 3. As a result of the coil shape of the ring body 62, the ring ends 2, 3, viewed in a direction transverse to the ring axis, are positioned immediately adjacent to each other (FIG. 1). The ring ends 2, 3 are formed by a ring section 63, 64 which extends across approximately 180°. The free ends of the ring sections 63, 64 are positioned with minimal spacing opposite the corresponding area of the annular body 62.

The ring ends 2, 3 form the compensation sections that enable widening of the clamped hose, for example, by heating. The ring ends 2, 3 in such a case can expand elastically and can compensate the diameter enlargement of the clamping rings 1 upon expansion of the clamped hose by elastic deformation. When the hose retracts again, the ring ends 2, 3 will also elastically contract.

The clamping rings 1 are comprised advantageously of a spring wire with circular cross-section in order to avoid damage to the hose. The wire that forms the clamping rings 1 can however also have an angular or generally non-round cross-section.

The clamping rings 1 are seated with one ring end 2, 3 on the housing-fast bearing pin 4 and with the other ring end on the piston-side bearing pin 5. When the piston 9 is moved in the described way by pressure medium loading, the clamping rings 1 are contracted by elastic deformation and in this way the hose is clamped on the connecting piece.

In the housing 6, the containers 50, 51, the piston 9, and the opening element 55 of the trigger element 53 are housed protected from external influences such as soiling, damage and the like.

In order to prevent the ring ends seated on the piston-side bearing pins 5 from sliding off, securing discs 65, 66 (FIG. 1) are positioned on the bearing pins 5 and engage across the ring ends seated on the bearing pins 5 and thereby prevent them from sliding off the bearing pins.

With the clamping device the hoses can be reliably clamped on the connectors in a simple way. Since the piston 9 is secured by the locking pawl 26 against retraction, the clamping process is very simple. The operator must only pull at the grip member 53 in order to trigger the chemical reaction in the piston chamber 15 in the described way. The foam which is produced in the piston chamber pushes the piston 9 automatically out of the piston chamber so that the clamping rings 1 are clamped. The clamping process can be quickly performed in this way; this is in particular advantageous when a plurality of clamping devices must be actuated.

Generation of pressure media, for example of the described foam, is known. The magnitude of the pressure which is to be applied in the piston chamber 15 and thus the quantity of the components to be housed in the containers 50, 51 depends on the clamping force to be applied. It can therefore be determined in a simple way.

The pressure medium can also be in the form of gas which is contained, for example, in a cartridge as a container that is arranged within the piston chamber 15 and that, for triggering the clamping process, is opened with a trigger element so that the gas can flow out and displace the piston 9 in the described way.

Figure 15:
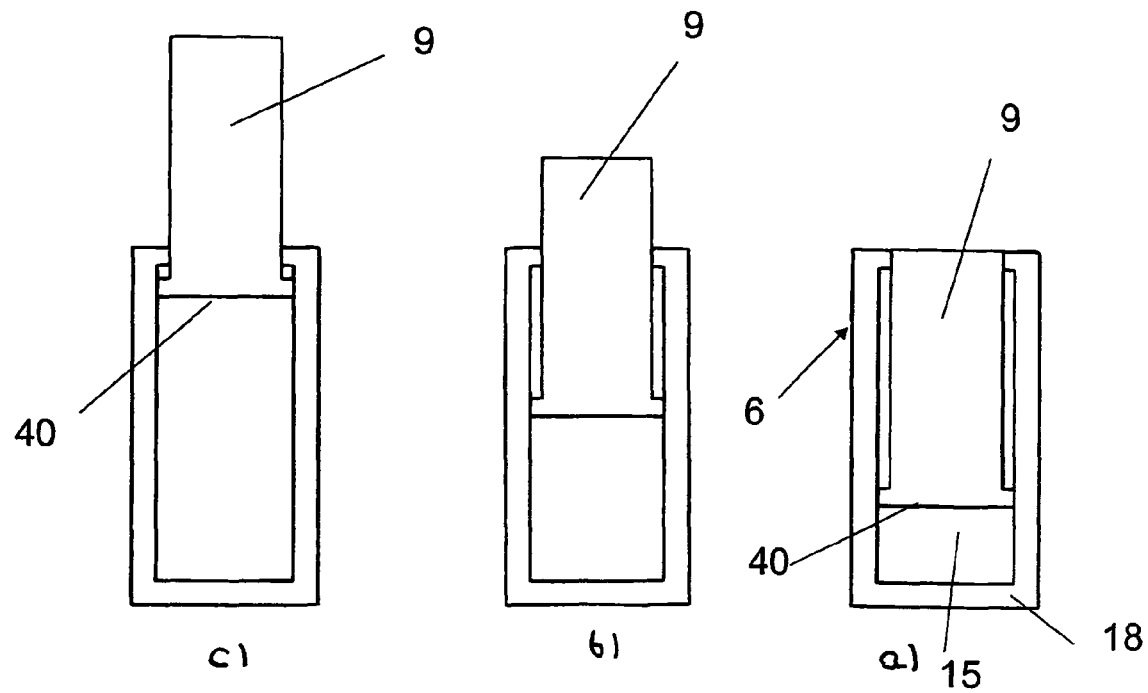
FIG. 15 in a simplified illustration a further embodiment of a clamping device according to the invention, embodied as a pressure cylinder, in different positions.

FIG. 15 shows a further application of a clamping device. It is designed as a pressure cylinder and has the piston 9 which extends straight in contrast to the preceding embodiment. FIG. 15a shows the piston 9 in its retracted position. Its piston surface 40 which is to be loaded is positioned at a spacing from the end wall 18 of the housing 6. In this area of the piston chamber 15 there are containers 50, 51 (not illustrated) with a foaming agent. When the piston 9 is to be extended, in accordance with the preceding embodiment the containers are opened with the trigger element (not illustrated) so that the released components can react with each other and load the piston surface 40 with the required pressure. The piston 9 is secured in accordance with the preceding embodiment with at least one locking pawl against a return movement.

Figure 16:
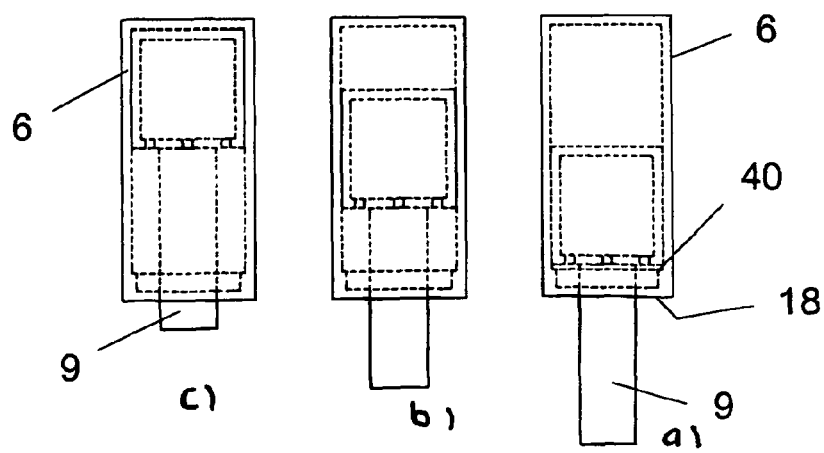
FIG. 16 in a simplified illustration a further embodiment of a clamping device according to the invention, embodied as a pulling cylinder, in various positions.

FIG. 16 shows a clamping device which is designed as a pulling cylinder. In contrast to the preceding embodiment, the piston 9 in the starting position is maximally moved out of the housing 6. Between the end wall 18 of the housing 6 and the piston surface 40 to be loaded the pressure medium is disposed in the containers. When the clamping process is to be initiated, the foaming agent is released in the described way so that the piston 9 is pushed into the housing 6.

Figure 17:
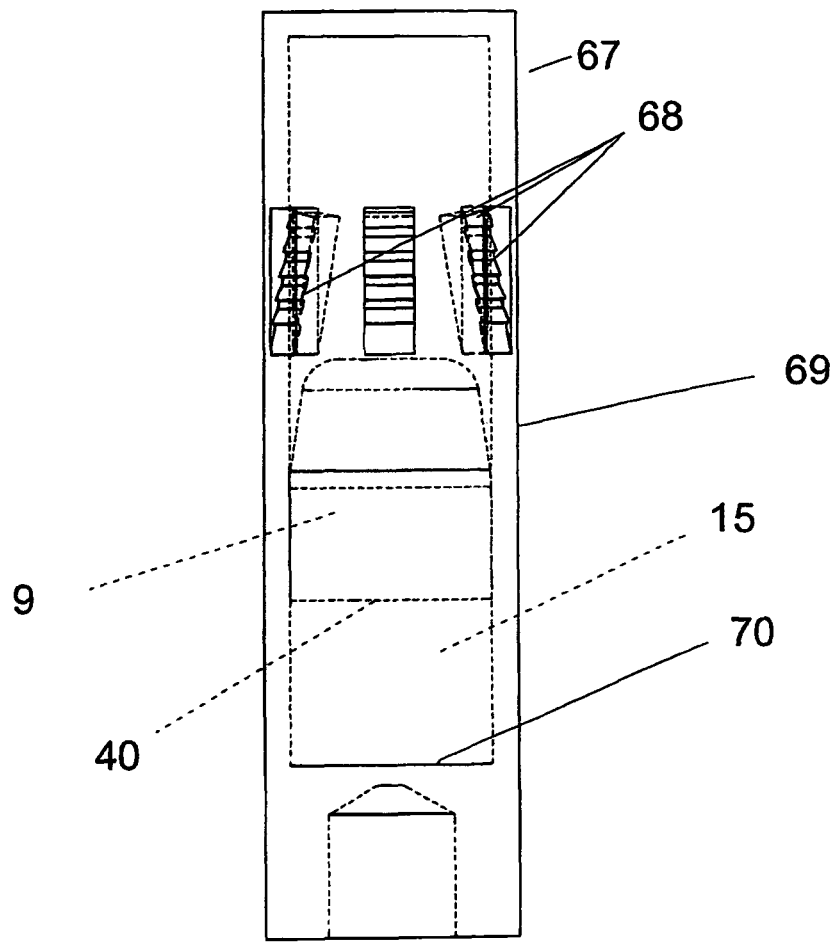
FIG. 17 in a simplified illustration a further embodiment of a clamping device according to the invention embodied as a spreading anchor in the starting state.
Figure 18:
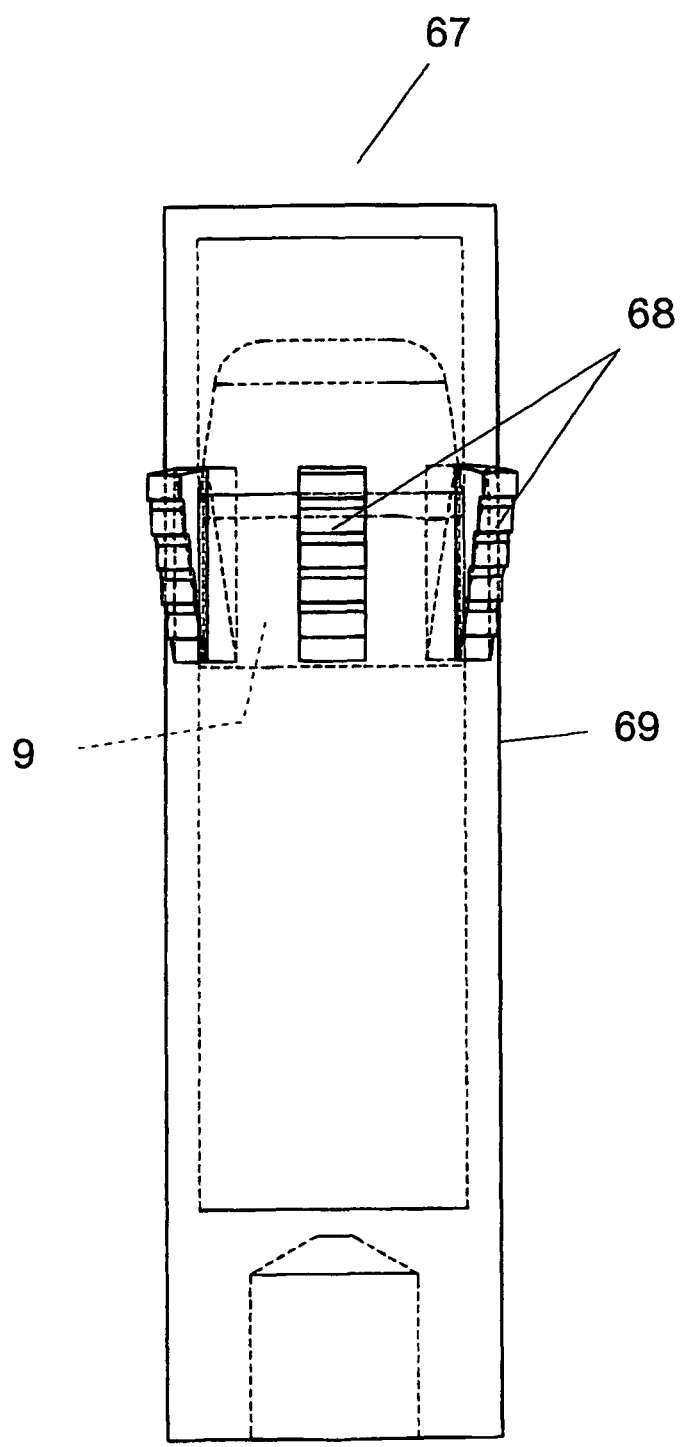
FIG. 18 the clamping device according to FIG. 17 in the operating state.

The clamping device according to FIGS. 17 and 18 is mounted in a schematically illustrated anchor 67 that has distributed about its circumference spreading elements 68. In the starting position (FIG. 17) the spreading elements 68 are bent back so far that they do not project past the outer wall 69 of the anchor 67. In the anchor 67 there is the piston chamber 15 in which the piston 9 is housed. Between the piston 9 and the bottom 70 of the piston chamber 15, the pressure medium is arranged which is released for the clamping process and acts on the piston surface 40. The piston 9 is displaced in this way and forces the spreading elements 68 outwardly so that they project past the outer wall 69 of the anchor 67 (FIG. 18). The end of the piston 9 opposite the piston surface 40 is of a tapering configuration so that the spreading elements 68 are reliably bent outwardly. The piston 9, in turn, can be secured by at least one locking pawl in its end position illustrated in FIG. 18 so that the spreading elements 68 are secured against springing back.

Figure 19:
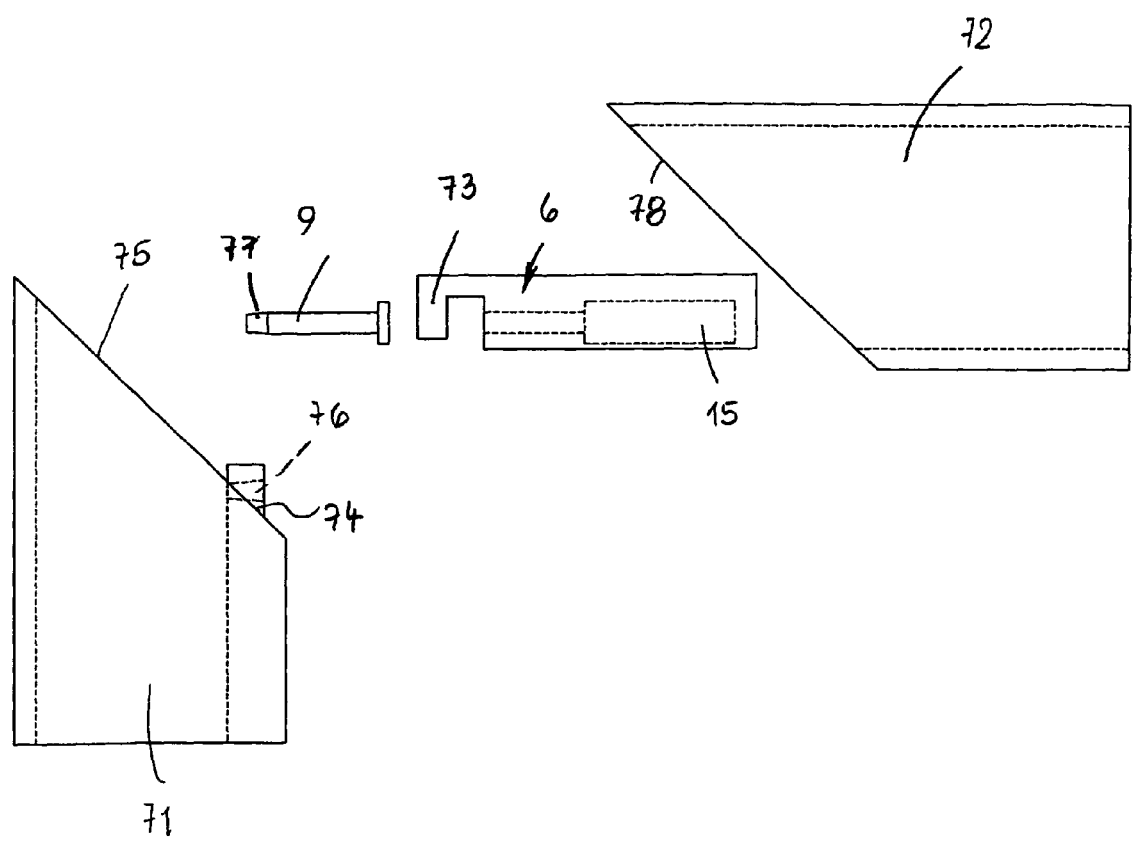
FIG. 19 in an exploded illustration an embodiment of the connection of two frames positioned at a right angle to each other by means of a clamping device according to the invention.
Figure 20:
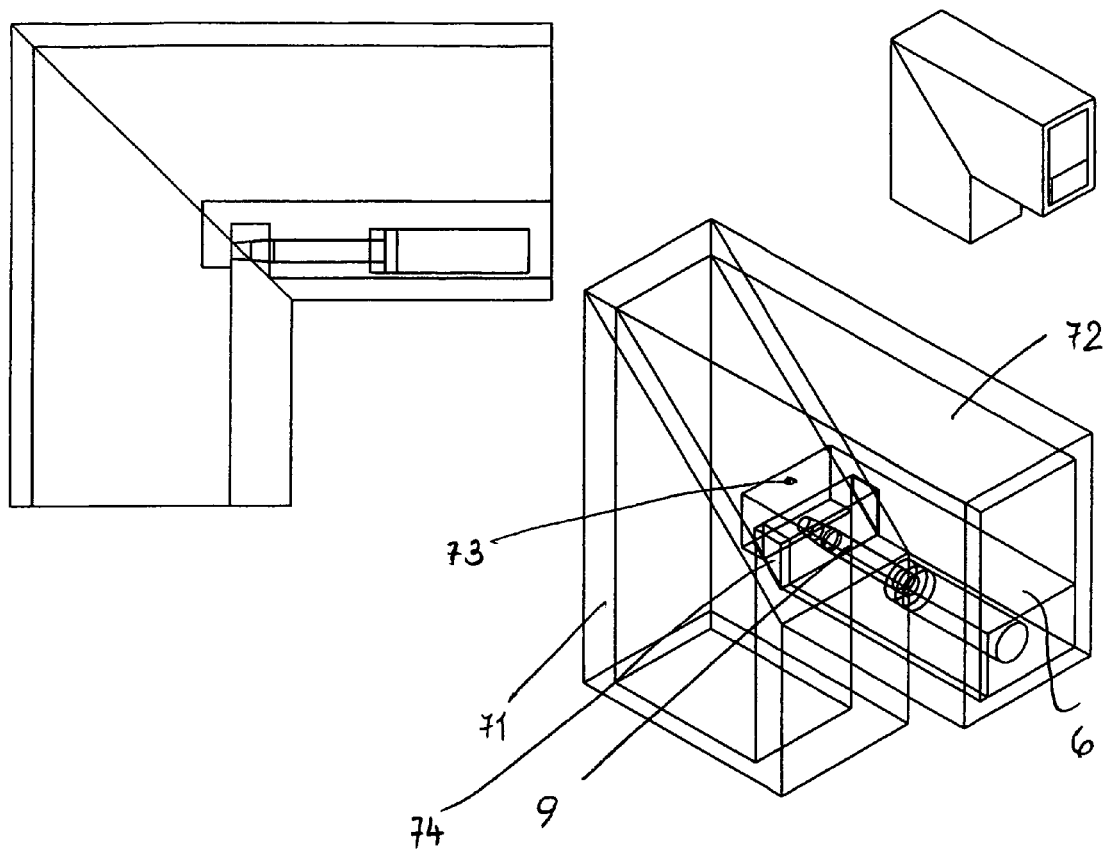
FIG. 20 in a perspective illustration the arrangement according to FIG. 19.

FIGS. 19 and 20 show how with the aid of the clamping device 2, mitered frame parts that are positioned at a right angle to each other can be connected to each other. The two frame parts 71, 72 are hollow profiled members which in the mounted position are positioned at a right angle to each other. The clamping device comprises the piston 9 which is housed in the piston chamber 15 of the housing 6. The housing 6 has a hook-shaped projection 73 (FIG. 19) with which the housing 6 engages across a securing part 74 which is attached on the inner side of the frame part 71 and projects past the mitered side 75 of the frame part 71. In the securing part 74 there is a conical opening 76 that is engaged by a conical end section 77 of the piston 9.

The housing 6 is attached within the frame part 72 such that the hook-shaped projection 73 of the housing 6 engages across the securing part 74. When the piston 9 is loaded with the pressure medium, it is pushed out of the housing 6 and moves with its end section 77 in the extension direction into the tapering conical opening 76 of the securing part 74. By means of the projection 73, the frame part 72 with its miter cut side 78 is pulled tightly against the miter side 75 of the frame part 72.

In a further embodiment (not illustrated), in the piston chamber 15 as a pressure medium at least one pre-tensioned pressure spring is provided which loads the piston 9. The piston 9 is first held in its starting position with at least one locking part. In order to tension the clamping ring 1, the locking part is moved by means of a triggering element into a release position so that the piston 9 is released. Under the force of the pre-tensioned pressure spring the piston is then adjusted from its starting position into the clamping position in which the clamping rings 1 clamp tightly the hose on the connecting piece.

It is finally also possible to produce the pressure medium by pyrotechnical means. In this case, in the piston chamber 15 a miniature explosive charge is arranged which is ignited by the trigger element 52 when the clamping rings 1 are to clamp the hose on the connecting piece. The explosion pressure which is produced by igniting the miniature explosive charge moves the piston 9 reliably from the starting position into the clamping position.

What is claimed is:

1. A clamping device comprising:
   a housing having a pressure chamber;
   a clamping element disposed in the housing and moveable from a starting position into a clamping position;
   wherein the clamping element delimits the pressure chamber in the housing;
   a pressure medium disposed in the pressure chamber;
   a trigger element acting on the pressure medium;
   wherein the pressure medium, when actuated by the trigger element, moves the clamping element in a pressure loading direction from the starting position into the clamping position;
   a clamping ring, wherein the clamping element is provided with a first connector and a first end of the clamping ring is connected to the first connector;
   wherein the housing has a second connector and a second end of the clamping ring is connected to the second connector;
   wherein the first and second ends are annular and elastically expandable.

2. The clamping device according to claim 1, wherein the clamping element is a piston supported slidably within the housing.

3. The clamping device according to claim 1, wherein the clamping element is moveable only in the pressure loading direction.

4. The clamping device according to claim 3, further comprising a locking element, wherein the locking element secures the clamping element against moving opposite to the pressure loading direction.

5. The clamping device according to claim 4, wherein the locking element is a locking pawl which engages, loaded by a spring, a toothing provided on the clamping element.

6. The clamping device according to claim 1, further comprising a container disposed in the pressure chamber, wherein the container is opened by the trigger element for releasing the pressure medium.

7. The clamping device according to claim 6, wherein the trigger element has at least one opening element with which the container is opened.

8. The clamping device according to claim 7, wherein the opening element has at least one pointed tooth with which the container is penetrated.

9. The clamping device according to claim 6, wherein the trigger element has an opening element arranged in the pressure chamber and adapted to open the container, wherein the trigger element further has a grip member positioned outside of the housing, wherein the grip member is connected by a connecting part to the opening element.

10. A clamping device comprising:
    a housing having a pressure chamber;
    a clamping element disposed in the housing and moveable from a starting position into a clamping position;
    wherein the clamping element delimits the pressure chamber in the housing;
    a pressure medium disposed in the pressure chamber;
    a trigger element acting on the pressure medium;
    wherein the pressure medium, when actuated by the trigger element, moves the clamping element in a pressure loading direction from the starting position into the clamping position;
    a clamping ring operatively connected to the clamping element;
    a container disposed in the pressure chamber, wherein the container is opened by the trigger element for releasing the pressure medium;
    wherein the container contains liquid starting materials which, after opening of the container, form a foam by chemical reaction and the foam acts as the pressure medium.

11. The clamping device according to claim 10, wherein the clamping element is provided with a first connector and a first end of the clamping ring is connected to the first connector.

12. The clamping device according to claim 11, wherein the housing has a second connector and a second end of the clamping ring is connected to the second connector.

13. The clamping device according to claim 12, wherein at least one of the first and second ends is a compensation section.

14. The clamping device according to claim 12, wherein the first and second ends are annular and elastically expandable.

15. The clamping device according to claim 11, wherein the first end is a compensation section.

16. A clamping device comprising:
    a housing having a pressure chamber;
    a clamping element disposed in the housing and moveable from a starting position into a clamping position;
    wherein the clamping element delimits the pressure chamber in the housing;
    a pressure medium disposed in the pressure chamber;
    a trigger element acting on the pressure medium;
    wherein the pressure medium, when actuated by the trigger element, moves the clamping element in a pressure loading direction from the starting position into the clamping position;
    a clamping ring operatively connected to the clamping element;
    a container disposed in the pressure chamber, wherein the container is opened by the trigger element for releasing the pressure medium;
    wherein a plurality of said container are provided and said containers contain liquid starting materials which, after opening of said containers, form a foam by chemical reaction and the foam acts as the pressure medium.

17. A clamping device comprising:
    a housing having a pressure chamber;
    a clamping element disposed in the housing and moveable from a starting position into a clamping position;
    wherein the clamping element delimits the pressure chamber in the housing;
    a pressure medium disposed in the pressure chamber;
    a trigger element acting on the pressure medium;
    wherein the pressure medium, when actuated by the trigger element, moves the clamping element in a pressure loading direction from the starting position into the clamping position;
    a clamping ring operatively connected to the clamping element;
    a container disposed in the pressure chamber, wherein the container is opened by the trigger element for releasing the pressure medium;
    wherein the trigger element has an opening element arranged in the pressure chamber and adapted to open the container, wherein the trigger element further has a grip member positioned outside of the housing, wherein the grip member is connected by a connecting part to the opening element;

wherein the housing is provided with at least one cutting edge for severing the connecting part of the trigger element.

* * * * *